United States Patent [19]

Whittaker et al.

[11] Patent Number: 4,658,353
[45] Date of Patent: Apr. 14, 1987

[54] SYSTEM CONTROL NETWORK FOR MULTIPLE PROCESSOR MODULES

[75] Inventors: Bruce E. Whittaker, San Juan Capistrano; James H. Jeppesen, III, El Toro; Andrew W. Beale, Laguna Hills, all of Calif.

[73] Assignee: Burroughs Corporation, Detroit, Mich.

[21] Appl. No.: 673,256

[22] Filed: Nov. 20, 1984

[51] Int. Cl.[4] ............................................. G06F 15/16
[52] U.S. Cl. .................................................... 364/200
[58] Field of Search ...................... 364/200 MS File; 340/825.5, 825.51

[56] References Cited

U.S. PATENT DOCUMENTS

4,456,956 6/1984 El-Gohary et al. ................. 364/200

Primary Examiner—Raulfe B. Zache
Attorney, Agent, or Firm—Alfred W. Kozak; Nathan Cass; Kevin R. Peterson

[57] ABSTRACT

A system for controlling communication in a network of digital modules where each digital module has a maintenance processor which connects the digital module through a network bus to every other digital module's maintenance processor. Each transmitting module can lock up the network bus temporarily for data transmission operations to a specifically addressed receiver module. This system basically permits free communication access of any digital module to any other digital module.

12 Claims, 9 Drawing Figures

SYSTEM CONTROL NETWORK.

FIG.1. SYSTEM CONTROL NETWORK.

FIG. 1A. MAINTENANCE PROCESSOR--BLOCK DIAGRAM.

FIG.1C. SYSTEM CONTROL NETWORK—MIP TYPE—BLOCK DIAGRAM.

FIG.5. NETWORK MESSAGE DELAY / TIME-OUT.

FIG.6. SYSTEM AND POWER INTERFACE MASTER CARD UNIT.

SYSTEM CONTROL NETWORK FOR MULTIPLE PROCESSOR MODULES

FIELD OF THE INVENTION

This disclosure refers to a network of multiple processor modules wherein means are provided for instruction and control signals to be communicated from any one processor module to another processor module.

CROSS REFERENCES TO RELATED APPLICATIONS

This disclosure is related to a patent application entitled "Power Control Network Using Reliable Communications Protocol", U.S. Ser. No. 654,089, filed Sept. 25, 1984, inventors James H. Jeppesen III and Bruce E. Whittaker; and also to another patent application entitled "Power Control Network for Multiple Digital Modules", U.S. Ser. No. 662,477, filed Oct. 18, 1984, inventors Bruce E. Whittaker, James H. Jeppesen III, and Larry D. Sharp.

BACKGROUND OF THE INVENTION

Modern day computers and computer systems no longer sit alone and work in isolation. Today, processors and main computer operating systems are interconnected to form networks where coordination and communication between the operating systems is absolutely essential for accomplishing the tasks required of the network in an efficient manner.

Many problems arise in the establishing of communications betwen the separate computer systems. Many networks are limited to fixed hierarchies of communication where only certain levels of processors can communicate directly with comparable levels but no direct paths of communication are available for subordinate or senior levels of processors.

The presently described system network provides an organization whereby simple and direct communication channels can be freely established between any two units in the network in a simple non-hierarchical direct manner. Thus, any unit has an equal opportunity to gain access to, and to communicate with, any other unit in a direct line without the need to have to make indirect connections or bridge through another unit which is not necessarily involved in the data transfer operation.

SUMMARY OF THE INVENTION

The presently described System Control Network (SCN) provides an organization of elements whereby a multiple number of processors or other digital units can be interconnected so that direct communication channels can be established between any unit as a transmitter and any other unit as a receiver. Thus, "free access" of communication is provided for each digital unit in a simple system of logic units which do not require special cabling such as coaxial or other specialized interconnection. Yet data rates of 1 Megabit can be effectuated in a most economical manner also without specialized types of hardware.

This "free access" communications organization is effectuated by a logic and network bus architecture wherein each processor or separate digital module has a maintenance interface processor which includes a network interface logic unit. The network interface logic unit connects internally to the maintenance processor and connects via network bus to a master card logic unit which provides communication with a power control subsystem and to a remote service center (diagnostic subsystem).

A system network bus is utilized by a special protocol whereby a digital module acquires the network bus and temporarily "locks-out" other contenders for the bus. Then a message is transmitted by addressing a destination, transferring message data, and receiving an acknowledgment after which the network bus is released for another contender to use the bus.

The master card logic unit controls the access to the network bus by the power subsystem and the diagnostic subsystem. Thus any digital module, whether it be a processor or a unit in the power subsystem or in the remote support center, can exchange data (or commands) with any other digital unit in the network.

DESCRIPTION OF THE PREFERRED EMBODIMENT

Figure 1:
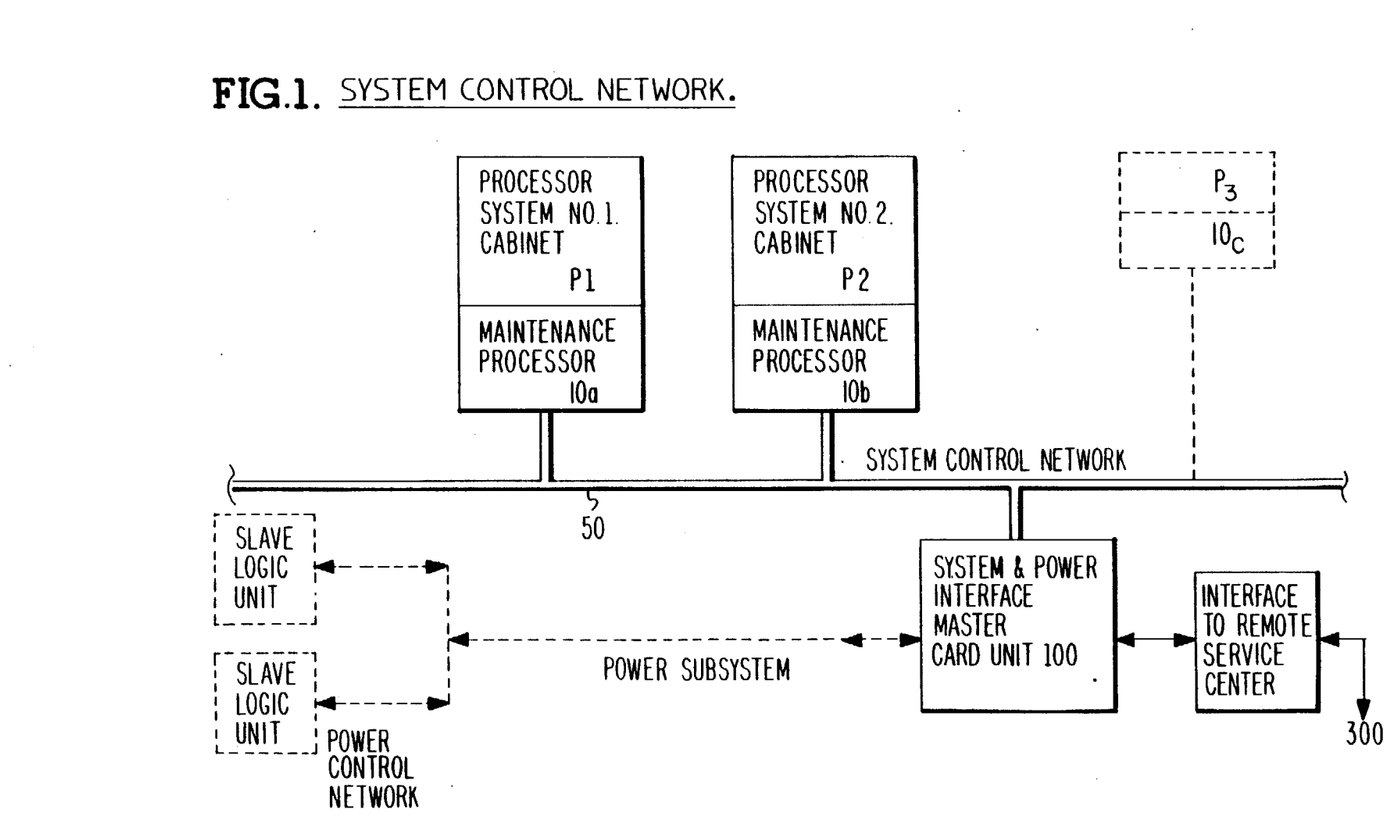
FIG. 1 is a block diagram of the system control network showing multiple numbers of processor systems connected to a system and power interface master card unit.

As seen in FIG. 1, the system control network (SCN) involves multiple numbers of main processors, such as P1, P2, P3, etc. Each of the main processor systems is provided with a maintenance processor $10_a$, $10_b$, $10_c$, etc. The system control network bus 50 connects each maintenance processor and a system and power interface master card unit 100.

The system control network is a dedicated, inexpensive high-speed network which provides for the passing of messages, commands, and data files between the elements of the various maintenance processors.

The system control network may have up to 15 connecting units. They may include future units such as a unit designated as a SCP-DLP (System Control I/O Processor - Data Link Processor) which connects the Main Processor software with the maintenance processor software.

In an alternate version the system control network of FIG. 1 may include a system control I/O processor (SCP) (not shown) which can be connected to the bus 50.

The system control network is implemented as a parallel, "contention" network having no single master or primary controlling element. Each element on the network has a unique address which is used for controlling message transmissions and for receiving messages. Any element on the network may be able to communicate with any other element on the network.

The system control network (SCN) integrates the hardware elements for the multi-processor computer system. These hardware elements include: (i) the maintenance processors for each main processor system, which initialize and maintain the processors; and (ii) the system control I/O processors (future) which integrate the main processor system software with the software of the SCP; and (iii) the system and power interface master card unit 100 which integrates the system remote power control and the maintenance subsystem as shown in FIG. 1.

The system control and maintenance subsystem is organized to provide the following functions:
Main processor initialization;
Main processor firmware loading;
Main processor display;
Main processor testing;
I/O controls maintenance;
Remote support center interface;
System power control.

The system control network interconnects the various elements of the Maintenance Subsystem. The elements which connect on to the system control network are:
Processor cabinet maintenance processors;
Power network master logic unit;
System control processor-data link processors (SCP-DLP).

The system and power interface master card unit 100 in FIG. 1 provides interconnection between the system control, the power control and the remote support subsystems. The card unit 100 thus connects to the following items:

(a) The system control network;
(b) The power control network;
(c) The remote support center interface.

The maintenance subsystem involves:

(a) Independent memory cabinets (which house the card unit 100 and remote support interface);
(b) The main processor cabinet (including its internal maintenance processor);
(c) Other system cabinets, as required.

Maintenance Processor:

The maintenance processor ($10_a$, $10_b$, etc.) is made up of work station terminals called an ergonomic work station (EWS), and a maintenance interface processor card 10 (MIP).

Figure 1A:
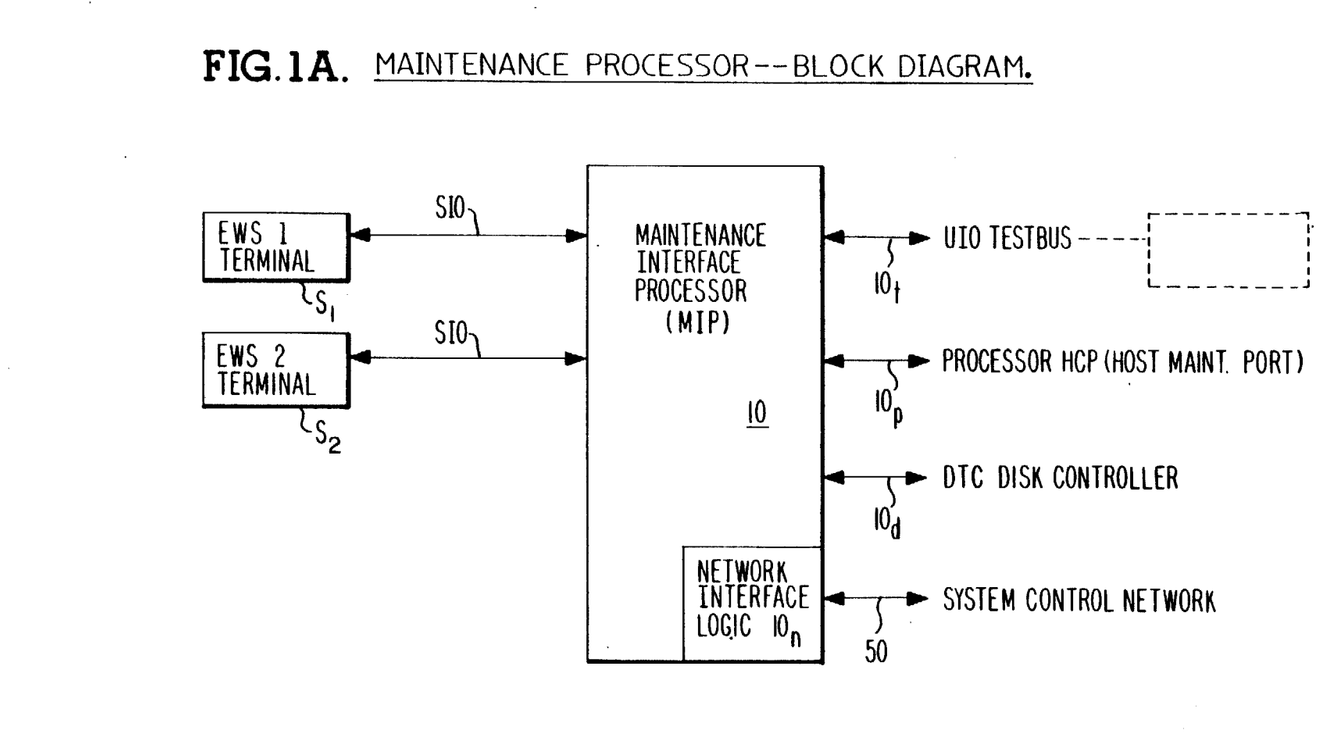
FIG. 1A is a block diagram of the Maintenance Interface Processor and its relation to the system control network.

FIG. 1A shows the maintenance processor itself together with its internal network interface logic $10_m$.

In FIG. 1A there are two work station terminals, $S_1$ and $S_2$, connected to the maintenance interface processor 10. The MIP 10 has four buses shown which include the UIO (Universal Input/Output) test bus $10_t$, the processor HCP bus $10_p$, the disk controller bus $10_d$, and the bus for the system control network 50.

The "ergonomic" work station (EWS) terminals in FIG. 1A can act both as a system supervisory operator (SPO) and as the intelligence for the maintenance processor 10. The ergonomic work station is a microprocessor base system which uses the Intel 8086 microprocessor. The Intel 8086 microprocessor is described in a publication entitled "iAPX Users Manual", copyright 1981 by Intel Corp. of 3065 Bowers Avenue, Santa Clara, Calif. 95051.

Figure 1B:
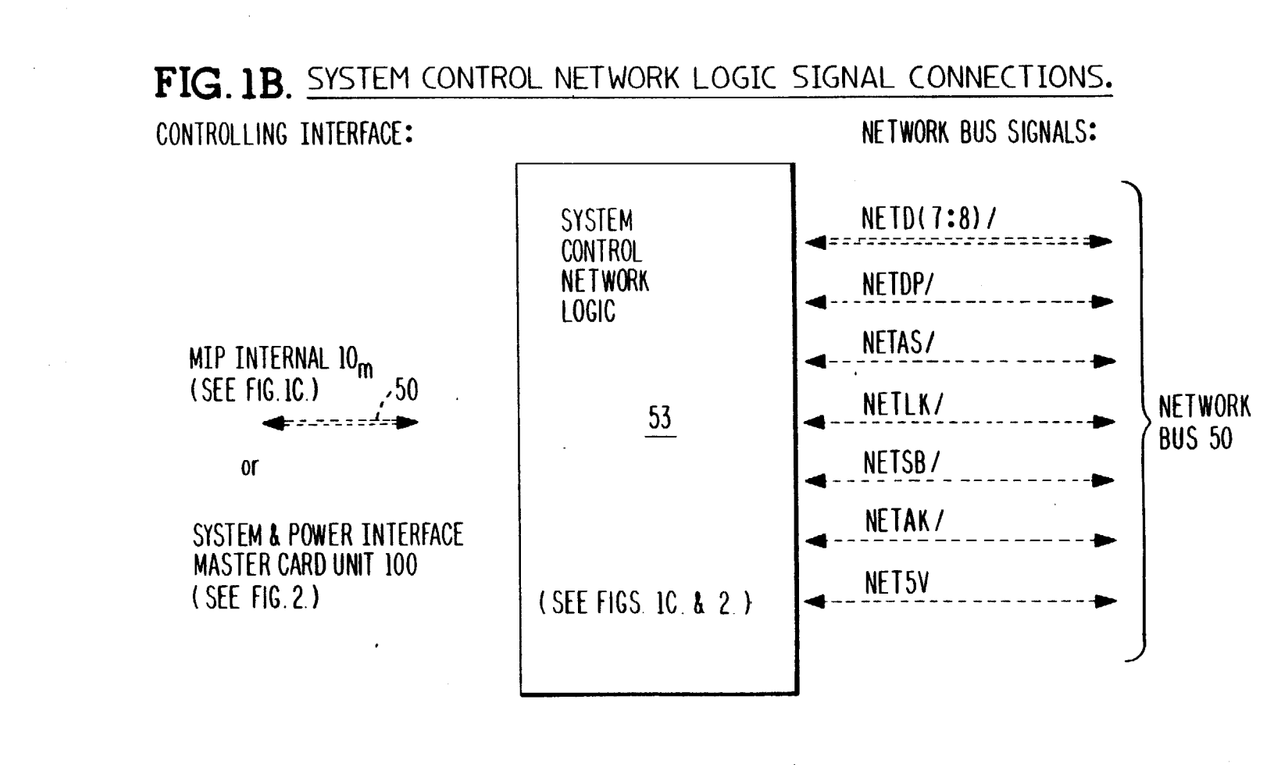
FIG. 1B is a signal connection drawing showing the system control network logic linking the maintenance processor to the system bus.

System Control Network:

The System Control Network (SCN) interconnects the various elements of the maintenance subsystem and system control subsystem. In the described system, the SCN interface hardware is implemented in two ways, as indicated in 1B.

In one version, the SCN interface is integrated into the structure of the MIP 10 (maintenance interface processor). In the second version, dedicated control hardware is provided on the Power Interface Master Card 100.

Figure 2:
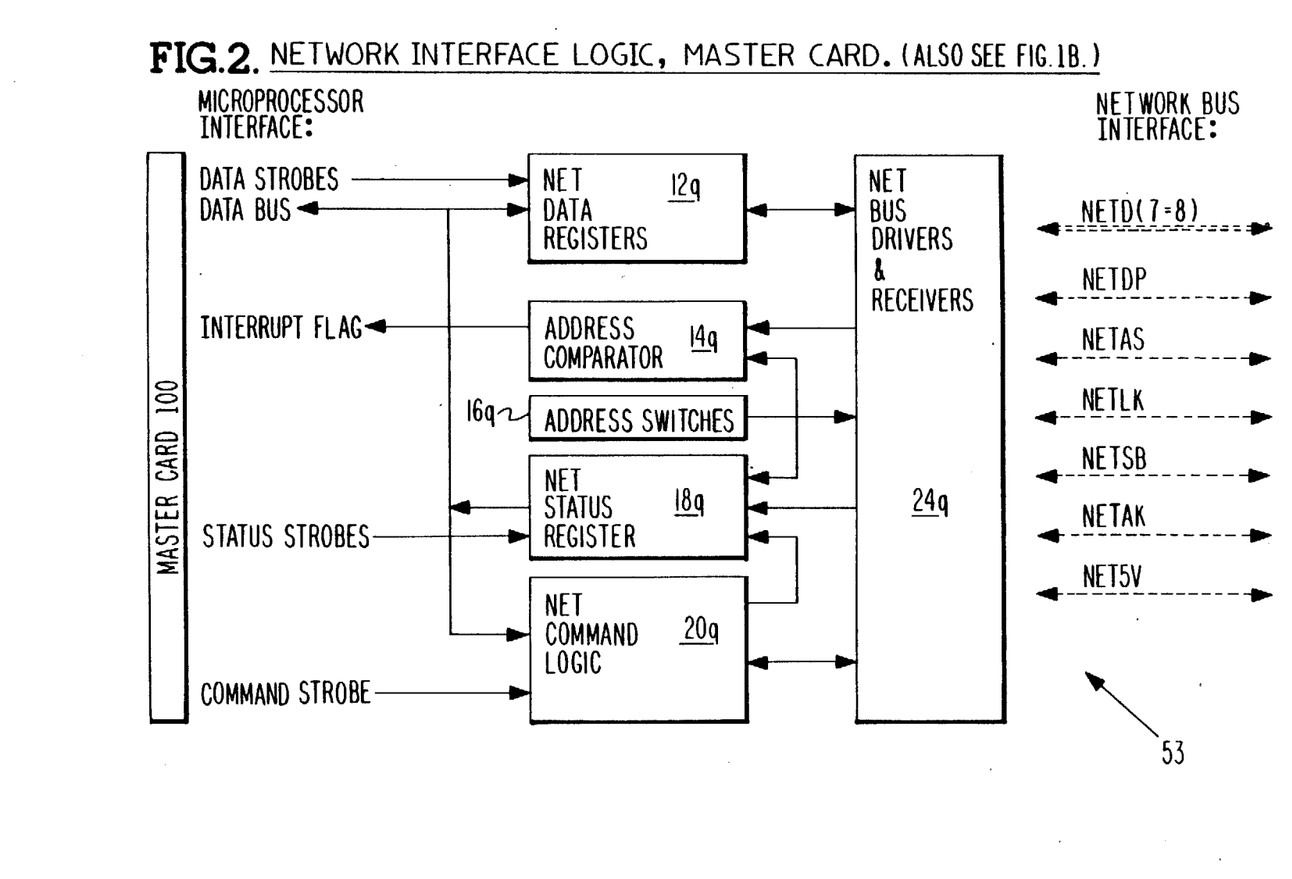
FIG. 2 is a block diagram of the network interface logic which connects the master card unit of FIG. 1 to the system control network buses.
Figure 6:
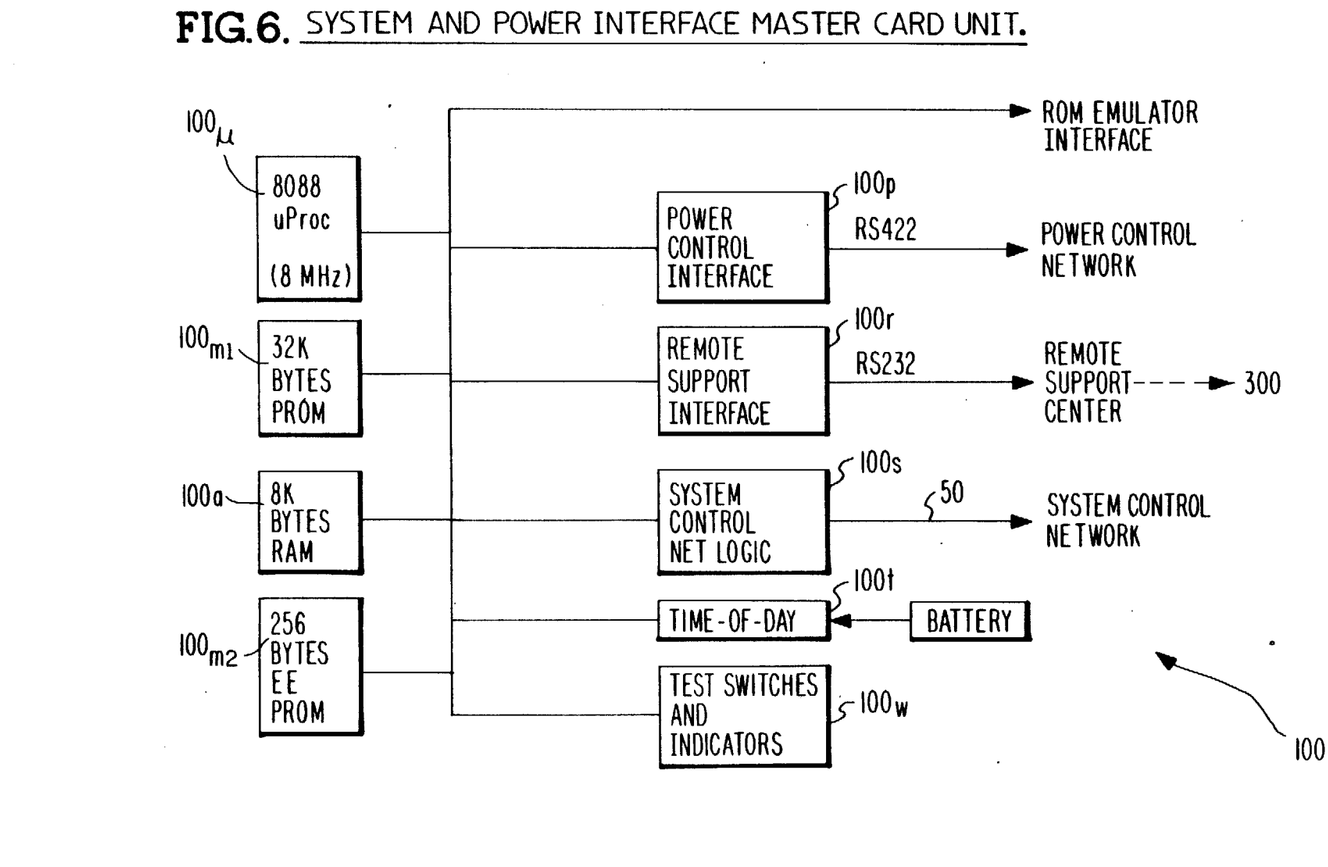
FIG. 6 is a block diagram of the system and power interface master card unit.

Thus the system control network logic block 53 of FIG. 1B can be implemented either as:

(a) internal logic in the maintenance processor 10 of FIGS. 1 and 1A, or
(b) the logic unit designated as the system and power interface master card unit 100 shown in FIGS. 1, 2 and 6.

System Control Network—"MIP Type" (Maintenance Interface Processor):

The system control network logic $10_m$ in the maintenance interface processor 10 is integrated into the internal MIP buses and the firmware structure. FIG. 1A shows the location of the network interface logic $10_m$ in the maintenance interface processor, 10.

Figure 1C:
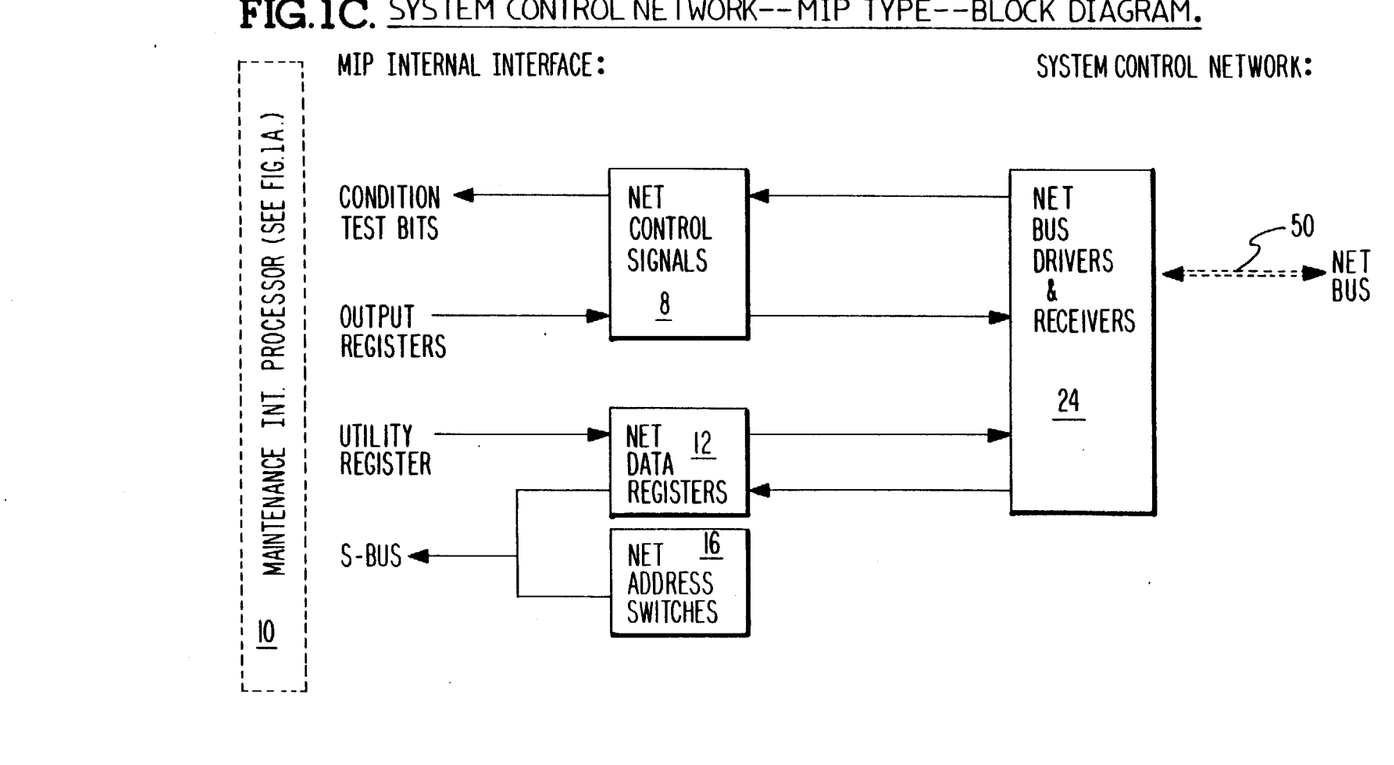
FIG. 1C is a drawing showing the interface between the Maintenace Processor and the system network bus.

In FIG. 1C, the maintenance interface processor 10 provides a two-way connection with the Net Control Circuit 8 which functions to get control of the SCN and to control the handshake functions to other interfaces.

A utility register (which interfaces the microprocessor and writes data to the SCN data registers) in processor 10 connects to data registers 12 which function to hold data to be transferred over the SCN and to receive data from the SCN.

The net control circuit 8 and data registers 12 provide bidirectional data transfer to the Network Bus Driver-Receivers 24.

The network address switches 16 permit an operator to set the identification address on the Network-MIP for communication addressing over the SCN.

Circuits 12 and 16 connect to the S bus which allows the microprocessor 10 to read the network address switches and the SCN data registers.

System Control Network (Master Type):

The power control master card 100 controls the system control network logic through dedicated net logic hardware.

FIG. 2 shows a block diagram of the system control network logic for the control master card type network interface hardware. Similar to FIG. 1C, the logic of FIG. 2 includes data registers $12q$ and address switches $16q$. Additionally, the FIG. 2 system has an address comparator $14q$, a status register $18q$ and a command logic circuit $20q$.

As seen in FIG. 2, the network bus interface provides six signal interconnections designated as NET-XX which provide the functions shown in TABLE I. These signals are defined as shown in the TABLE I hereinbelow.

TABLE I

| NETWORK BUS SIGNALS | |
|---|---|
| NET5V | +5VDC supplied through a diode by each Network connecting element for bus termination. |
| NETLK | LOCK signal used to obtain and maintain |

TABLE I-continued
NETWORK BUS SIGNALS

|       | transmitter control of the network. |
|-------|--------------------------------------|
| NETAS | ADDRESS signal used to indicate the presence of an Address byte on the net. |
| NETSB | STROBE handshake signal sent by a transmitter to indicate the presence of valid data on the net. |
| NETAK | ACKNOWLEDGE handshake signal sent by receiver to indicate the receipt of data byte on the net. |
| NETDP | DATA PARITY (odd parity) for the data bits (D7 - D0). |
| NETD [7:8] | DATA BITS. |

The system control network provides certain functions and commands which are listed hereinbelow in Table II.

TABLE II
FUNCTIONS AND COMMANDS OF SYSTEM CONTROL NETWORK

| FILE MANIPULATION: | Request microcode load |
| | Load microcode |
| | Request file upload |
| | Transfer file. |
| TIME FUNCTIONS: | Request time-of-day |
| | Transfer time-of-day value |
| | Set new time-of-day. |
| SYSTEM POWER CONTROL: | Request system power net action |
| | Request cabinet power information |
| | Transfer cabinet power information |
| | Set power control parameters |
| | Read power control parameters. |
| SYSTEM PARTITIONING: | Request processor ID |
| | Transfer processor ID |
| | Request partition status |
| | Transfer partition status |
| | Request system cabinet map |
| | Transfer system cabinet map |
| | Request system reconfiguration |
| | Abort system reconfiguration. |
| REMOTE SUPPORT FUNCTIONS: | Request remote interface write |
| | Transfer remote interface write status |
| | Request remote interface read data |
| | Transfer remote interface read data |
| | Transfer remote interface read status. |
| PROCESSOR MAINTENANCE: | Execute maintenance port commands. |
| HUMAN INTERFACE MESSAGES: | Display message text. |

Network Communication Phase:

Communication over the network can be initiated by any network device. There is no "primary controller" which dictates the activities over the network. There are basically five communication phases involved in the communication of a message on the network. These five phases are:
1. WAIT-FOR-ADDRESS
2. RECEIVE MESSAGE
3. GET BUS
4. TRANSMIT MESSAGE
5. MESSAGE ACKNOWLEDGE In FIG. 3 there is shown the various relationships between these enumerated five phases. Thus, in the "receiving" device, there is the phase of "WAIT-FOR-ADDRESS" which then permits the phase entitled "RECEIVE MESSAGE", after which a "MESSAGE ACKNOWLEDGE" signal is sent.

Figure 3:
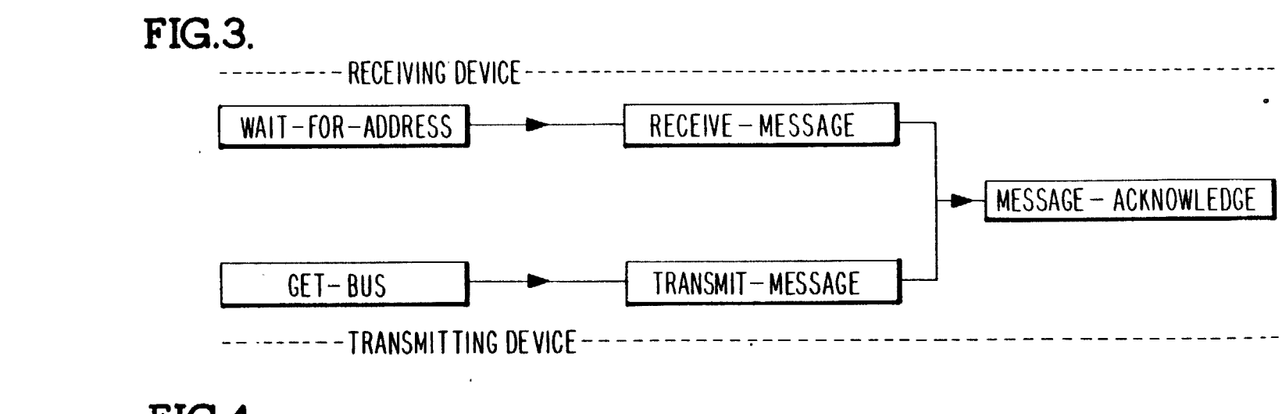
FIG. 3 shows the relationship of certain communication phases involved in the communication of a message on the network.

In the "transmitting" device, there is the phase entitled "GET BUS" which then permits the phase "TRANSMIT MESSAGE", which then allows for the "MESSAGE ACKNOWLEDGE" phase.

The "WAIT-FOR-ADDRESS" phase is the normal situation, and is not a transmitting state of a network device. In this phase, the network data bus is monitored for the destination address byte, FIG. 4. The address byte is valid on the data bus when the address (NETAS) and the strobe (NETSB) signals are active (TABLE I). If the address equals the net address switch value for this device, then the SCN interface logic (FIG. 2) prepares to receive the message. Following this, the next phase would be the "RECEIVE MESSAGE" phase.
Network RECEIVE MESSAGE Phase:

This "RECEIVE MESSAGE" phase should follow the "address detected" condition from the "WAIT-FOR-ADDRESS" phase. The first byte of data received is the destination address (FIG. 4) byte (which is detected in the WAIT-FOR-ADDRESS phase).

The handshake signals, STROBE and ACKNOWLEDGE (NETSB and NETAK) are used to send message bytes over the network.

Figure 4:
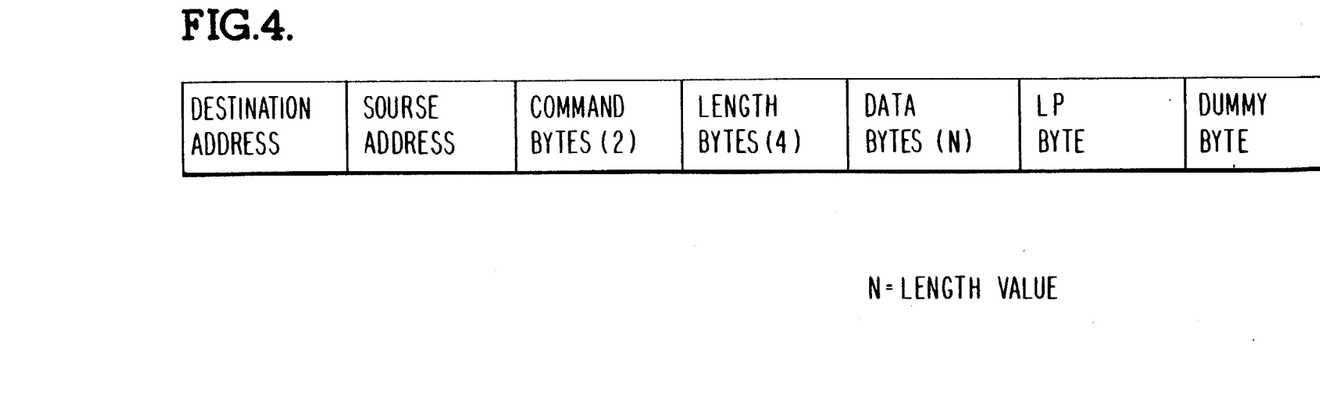
FIG. 4 shows a typical message format used in the system control network.

For each byte of data read (including the address byte), a longitudinal parity (LP) total must be calculated. The last byte received will be a LP (longitudinal parity) byte in order to ensure message integrity (FIG. 4).

The LP total is calculated doing the "exclusive OR" of a starting value of "00" hex and with each message byte. The longitudinal parity byte which is received at the end of the message should then cause the calculated total to be "FF" hex.

The next phase will be the MESSAGE ACKNOWLEDGE-RECEIVER phase.
Network GET BUS Phase:

When a network device has a message to be transmitted over the network, it must first get control of the network. The "GET BUS" phase accomplishes this. The network signal LOCK, NETLK/ (FIGS. 1B, 2) is used to control the System Control Network (SCN) by a transmitting device. This signal, when active, indicates that the network is busy. Any SCN device may activate it by following the procedure of the GET BUS phase.

GET BUS phase step 1: will monitor the LOCK input signal on the network. If it is active, then the bus is already busy and—go to step 5. If LOCK is not active, then the GET BUS phase may then proceed;—go to step 2.

GET BUS phase step 2: here the LOCK signal output to the network must be activated. At the same time, the address for this device (that is, the value which is equal to the address switches) must be driven into the network data lines—NETD[7:8] at FIGS. 1B and 2.

Thus, the network GET BUS address format will be reflected according to the following arrangement:

| 7 | 6 | 5 | 4 | 3 | 2 | 1 | 0 | ←Data Bus Bit Position |
|---|---|---|---|---|---|---|---|------|
| Address Switch Value | | | | | 0 | 0 | 0 | |

Figure 5:
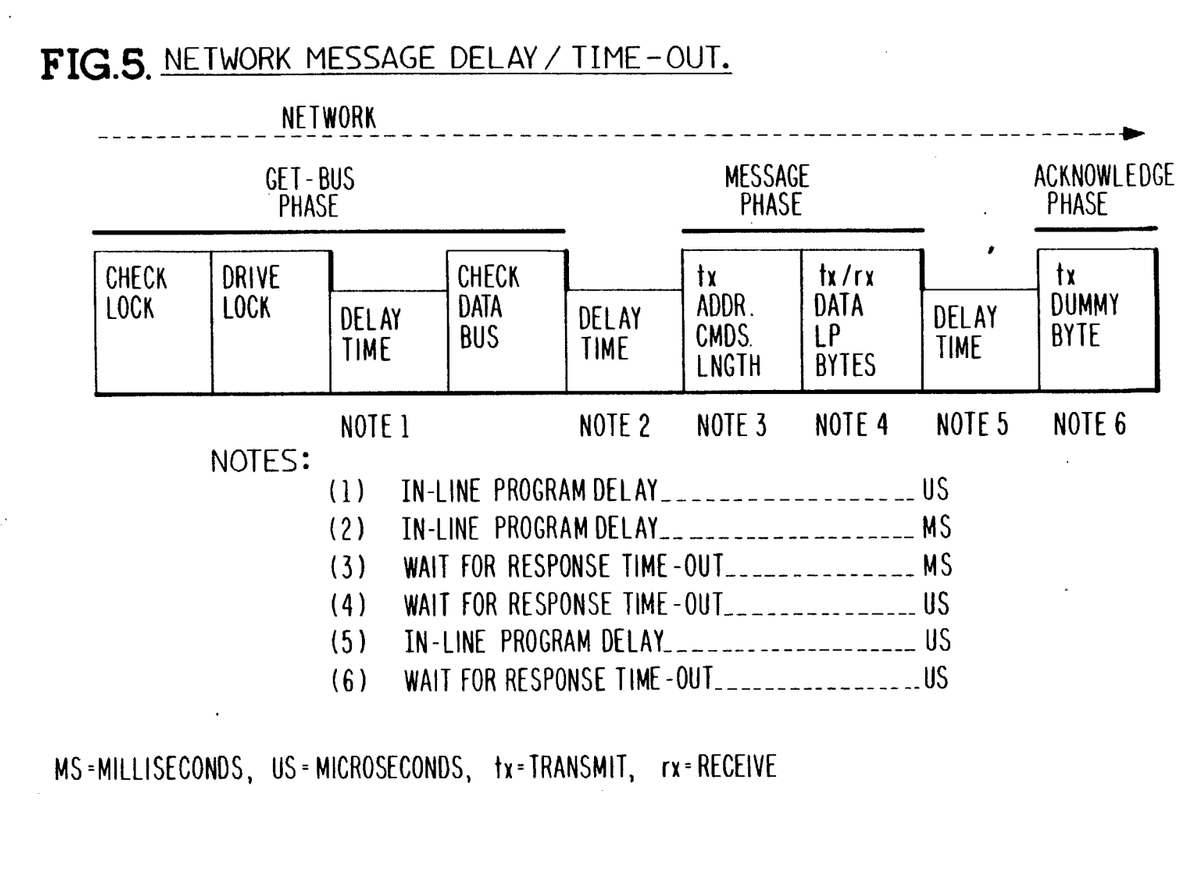
FIG. 5 is a schematic drawing of how the message flows are accomplished.

GET BUS phase step 3: after activating the LOCK signal and the unit address onto the network, a delay must occur (FIG. 5). After the delay, the network data bus must be read and compared to the unit address for this device. If the device address for this device is not on the data bus, then an "access conflict" has occurred. The LOCK and the data bus drivers must be deactivated and the process goes to step 5. If a good compare on the data bus occurs, then the GET BUS phase may proceed.

GET BUS phase step 4: if control of the network was obtained, the LOCK signal must continue to be asserted by the transmitting device as long as message transmission continues. The device address must be removed from the data bus. A delay must occur in order to allow other devices which failed Step 3 above (access conflict) to get off the bus. The next phase will be the SEND MESSAGE phase.

GET BUS phase step 5: if bus control is not obtained (that is, the bus is already busy or there is a bus "access conflict"), the device which is desiring network control must return back to the WAIT-FOR-ADDRESS phase for a "random" time and then try the GET BUS phase again.

Network SEND MESSAGE Phase:

During this phase, the LOCK output signal must remain active. The first byte to be sent is the "destination address byte" (FIG. 4). The address signal must be activated with this byte. The address signal must be de-activated for the remaining bytes of the message.

The handshake signals (STROBE and ACKNOWLEDGE) are used to send message bytes over the network. The transmitting device places information on the data bus NETD[7:8], and activates the strobe signal, NETSB. The receiving device reads the data bus and notifies the transmitter that it has received the information by activating the ACKNOWLEDGE signal, NETAK.

The transmitter then de-activates STROBE; the receiver then de-activates ACKNOWLEDGE.

The transmitting device must calculate a longitudinal parity (LP) on all the bytes which are sent over the network. The byte sent following the final data byte of the message is the actual LP byte (FIG. 4).

After the completion of the message transmission/reception phase, the next phase must be the MESSAGE ACKNOWLEDGE - TRANSMITTER phase.

The network message format is shown in FIG. 4 whereby certain data bits are provided for the destination address, for the source address, for the command bytes, for the longitudinal parity byte and for a dummy byte.

A schematic diagram of the message flow and relative delay times which are used for the GET BUS phase, the MESSAGE phase and the ACKNOWLEDGE phase is shown in FIG. 5.

After the completion of the message transmission, there is now provided the MESSAGE ACKNOWLEDGE-TRANSMITTER phase.

Network MESSAGE ACKNOWLEDGE Phase (FIG. 3):

1. MESSAGE ACKNOWLEDGE—"Transmitter":

After the transmission of the final message byte (that is, the longitudinal parity byte), the transmitting device must wait for the receiving unit to acknowledge the "OK" reception of the message. As seen in FIG. 5, the transmitter delays and then sends a "dummy byte". The dummy byte may be of any particular value.

If the message was received "OK", the receiving device will return the ACKNOWLEDGE signal in response to the STROBE signal for the dummy byte. If this does not happen within a preset period of time, then the transmitter will consider the message as "not OK" and the transmitter will transmit the message again.

2. MESSAGE ACKNOWLEDGE—"Receiver":

After the reception of the final message byte (that is, the longitudinal parity byte LP), the receiving unit must prepare to acknowledge the message. The receiver must first check the integrity of the message including longitudinal and vertical parity. While doing this, it must not at this time return the "ACKNOWLEDGE" to the STROBE for the dummy byte sent by the transmitter. If the message is "OK", then the receiver will ACKNOWLEDGE the dummy byte when it is received.

If the message was "not OK", the receiver will not respond to the dummy byte. This will also force a transmitter time out due to the "not OK" response. The transmitter/receiver flow for the network is shown in TABLE III.

TABLE III

| TRANSMITTER/RECEIVER FLOW | |
|---|---|
| TRANSMITTER Network Phase | RECEIVER Network Phase |
| Wait-For-Address ↓ | Wait-For-Address |
| Get-Bus ↓ | Wait-For-Address |
| Send-Address ↓ | Detect unit Address |
| Send-Message ↓ | Receive-Message |
| Delay after LPW byte ↓ | Check LPW & Vertical Parity |
| Send Dummy byte ↓ | Acknowledge "ok" |
| Message transmission complete. Return to wait-for-address. ↓ | Message reception complete. Return to wait-for-address. |

Network Message Format:

As was seen in FIG. 4, there was shown a messge of "N" bytes. All messages transmitted on the network bus will follow this format, Table IV, shown hereinbelow, indicates the detailed structure of each byte of this format.

TABLE IV

| NETWORK MESSAGE FORMAT | | |
|---|---|---|
| Byte # | Byte Name | Byte Description |
| 1 | ADDRESS 1 | Dn[4:5] = Message Destination Address. |
| 2 | ADDRESS 2 | Dn[4:5] = Message Source address. |
| 3 | COMMAND 1 | Specifies type of data to follow or desired action to be taken by the receiver. |
| 4 | COMMAND 2 | Continuation of COMMAND byte 1. Least significant byte of COMMAND. |
| 5 | LENGTH 1A | Specifies the length of data portion of message that follows. |
| 6 | LENGTH 2A | Continuation of LENGTH byte 1. Least significant byte of LENGTH. |
| 7 | LENGTH 1B | Duplicate of LENGTH 1A byte. |
| 8 | LENGTH 2B | Duplicate of LENGTH 2A byte. |
| 9 to N+9 | DATA | Data information. "N" is the value given by LENGTH bytes. |
| N+10 | LPW | Longitudinal parity byte for ALL bytes of message except "dummy". |
| N+11 | DUMMY | Dummy byte for message acknowledge. |

Note:
N = 0000 to FFFF hexadecimal.
N = 0000 indicates that no data bytes follow.

System and Power Interface Master Card Unit 100:

The master card unit 100 provides the central interconnection point for the system control network and for the power control network, in addition to the central connection for the remote support center interface 300 which provides remote diagnostics. It is also the master control for the power network which can provide for power-on/off actions of all the units in the network. However, the master card unit 100 is just another device in the system control network and does not hold any priority or master status as such.

In such a system as the multiprocessor system described herein, there may be only one active master at any given time. However, because of its importance to the system operation and maintenance, it is preferred that there should be a spare master card unit.

FIG. 6 shows a block diagram of the system and power interface master card unit 100.

The master card unit 100 provides a microprocessor (such as the described Intel 8088) which runs at 8 megahertz. It executes its code out of the PROM $100m_1$. The microprocessor $100_u$ of FIG. 6 makes use of the 8K RAM $100a$ for data buffers and operating stacks. It uses the electrically erasable PROM $100m_2$ to store configuration dependent option flags. The time of day circuit $100_t$ is backed up by a battery for operation during power failure times. Six indicators and five switches $100_w$ are provided on the card for maintenance of the card itself.

As seen in FIG. 6, a power control interface $100_p$ is used for power control by connections to various power units in the network.

The remote support interface $100_r$ connects to a remote support center 300 which is used for communication of system diagnostics and for maintenance purposes.

The system control network logic $100_s$ is the connection for the bus 50 of FIG. 1 which shows the interconnnections to the various processor systems.

Software Modules in the System and Power Interface Master Card Unit 100:

The card unit 100 will provide the following software modules:
  Common initialization modules;
  System specific initialization modules;
  Remote support modules;
  Memory management modules;
  Timer management modules;
  System control network modules;
  Power flow modules.

Common Initialization Module:

This module performs a basic confidence test on the hardware that is common to the universal interface processor 150 and the master card unit 100.

Specific Initialization Module:

This module performs confidence test on the specific hardware of the processor systems P1, P2, etc. of FIG. 1C. The system control network interrupt vector is set and the system control network logic is put into the "WAIT-FOR-ADDRESS" phase. This module also checks coontents of the electrically erasable PROM if required.

Remote Support Module:

This module performs all communications with the remote support center 300 for diagnostic purposes. The low level 8-bit protocol or BDLC protocol will be implemented in this module. The only remote support center command that the master card unit 100 must recognize and respond to, is the command to "power-on". All other messages will be shipped upstream over the system control network to the system control processors P1, P2, P3, etc. for processing.

Memory Management Module:

This module will manage all the free memory (RAM) in the master card unit 100. This module will allocate memory to the various requesting modules. If enough memory for a request is not available, the memory manager will inform the calling routine of how much is available. If the calling routine decides it cannot wait for its full request, it may request as much memory as is available. The memory manager will maintain the free memory in as large an area as possible.

Timer Management Module:

This module will manage all common timers betwen the power interface master card and the hardware of processors P1, P2, etc. These common timers include three 16-bit timers in the counter I/O chip. This module manages the locking mechanism for each timer; that is, if a timer is unavailable and one is required immediately, a software comparison on the timer day count will be used.

System Control Network Module:

This module is responsible for sending and receiving messages over the system control network. Half of this module is interrupt driven (the receiver function) and the other half of the module is user driven (the transmitter function). The master card 100 will initiate transmission over the system control network only under two conditions: (1) power conditions from the power control network, FIG. 1; (2) message received from the remote support center 300. All other master card transmissions will be in response to messages received on the network.

When a network interrupt occurs (for example, the master card network address has been received on a network), this module will receive the message up through the length bytes. If the length of the message is non-zero, enough memory will be obtained from the memory management module and the remainder of the message will be received. After reception of the entire message, the command (per TABLE II) will be executed by this module. This may include sending one or more messages back over the network. It may also include sending a message to the remote support module or to the power flow module.

Power Flow Module:

This module is the main program of the master card unit 100. When the master card unit has nothing else to do, it will monitor the power status of the installation. This is the chief function for the master card—that is, the monitoring and controlling of cabinet power. This module will maintain a map of all corresponding cabinets in the system. Included in the map are cabinet addresses and failure report bits. This module monitors the margin conditions, the power failures, and power change requests for the entire installation. The power status and control system is described in a co-pending application entitled "Power Control Network for Multiple Digital Modules", inventors Bruce E. Whittaker, James H. Jeppesen III, and Larry D. Sharp.

Interrupt-Priority:

In the master card unit 100, there is provision for certain interrupts which are set to have the following priorities:
  1. Timers (highest);
  2. Time of Day function;
  3. System Control network;
  4. Remote Support center;
  5. Power Control network.

These operate to interrupt the microprocessor $100_u$ of FIG. 6 so that the required service can be provided.

There has thus herein been described a system control network where equal opportunity is provided for any digital unit to become a transmitter so it can access and transfer data directly to any other digital unit in the network which can become a receiver. While the described embodiment can accomplish these functions, these may be accomplished in other embodiments which still operate within the scope of the invention as defined in the following claims.

What is claimed is:

1. In a network of multiple units of processors and digital modules, a control network system for providing direct communication capability between any two digital units in the network designated as a transmitting unit and a receiving unit, said system comprising:
   (a) a plurality of processor means wherein each processor means includes:
      (a1) Maintenance processor means for interfacing said processor means to a system network bus means, said maintenance processor means including:
         (a1a) means to generate a LOCK signal;
         (a1b) means to generate an address signal to indicate presence of address data;
         (a1c) means to generate a strobe when transmitting and an acknowledge signal when receiving;
   (b) network bus means connecting each maintenance processor means to every other maintenance processor means, said network bus means including:
      (b1) a first set of bit lines for transferring data bits from said transmitting unit to said receiving unit;
      (b2) a second bit line for carrying a LOCK signal to hold the network bus means available for exclusive use of the unit originating the LOCK signal, said LOCK signal originated by said transmitting unit;
      (b3) a third bit line for carrying an address signal, to a receiving unit, to indicate the presence of address byte data on the network bus means;
      (b4) a fourth bit line for carrying a strobe handshake signal, originated by said transmitting unit, for indicating valid data on the network bus means;
      (b5) a fifth bit line, originated by said receiving unit, to carry an acknowledge signal to indicate, to the said transmitting unit, the receipt of a data byte on the network bus means.

2. The network control system of claim 1 wherein said maintenance processor means includes:
   (a) means to generate a parity bit data signal for transfer over said network bus means.

3. The network control system of claim 1 wherein said network bus means includes:
   (a) means to generate a longitudinal parity data byte, after transmission of said data bits, for transfer from said transmitting unit to said receiving unit via said network bus means.

4. The network control system of claim 1 which further includes:
   (a) master card logic means connected to said network bus means, said master logic means including:
      (a1) microprocessor means having program memory and RAM storage means;
      (a2) first interface means for providing communication to a power control network;
      (a3) second interface means for providing communication to a remote support center for diagnostic operations;
      (a4) third interface means for providing communication to said network bus means;
   (b) said power control network connected to said first interface means for transferring data and command signals to the power supplies of each said digital unit in said network;
   (c) said remote support center connected to said second interface means for transferring data and diagnostic signals between said remote center and each said digital unit in said network.

5. The system control network of claim 1 which includes:
   (a) operator work station terminals connected to said maintenance processor means for providing operator input data and commands.

6. In a network of multiple digital units of processors and digital modules, a control network system for providing data transfer capability between any two units in the network whereby any unit can originate data output transfers as a transmitting unit and address any other unit as a receiving unit to receive data transfer, the said control network system comprising:
   (a) network bus means for connecting each of said processors and digital modules to each other;
   (b) logic means in each unit for acquiring access to said network bus means and for inhibiting access to said bus means by ohter units;
   (c) means, in each unit acting as a transmitter unit, for addressing a receiving unit and transferring message data and control data to said receiving unit, wherein the communication of data from said transmitting unit to said receiving unit is effectuated by a transmitted message format which includes:
      (i) destination address data:
      (ii) source address data;
      (iii) command data;
      (iv) message-length data;
      (v) data bytes:
      (vi) longitudinal parity data;
      (vii) dummy data;
      and wherein said dummy data indicates to said receiving unit that it can now send its acknowledge signal back to said transmitting unit, when the received data is without error;
   (d) means, in each unit acting as a receiving unit, to send an acknowledgement signal back to said transmitting unit for each data byte received and for each complete message received.

7. The system of claim 6 wherein said receiving unit includes:
   (a) means to inhibit said acknowledge signal in response to said dummy data when the longitudinal parity calculated over said message received does not match the longitudinal parity data sent by said transmitting unit;
   (b) means to inhibit said acknowledge signal in response to said dummy data if the vertical parity error has occurred on any data in the message transmitted.

8. The system of claim 7 wherein said receiving unit includes:
   (a) means to detect when the address on the network bus matches the address of the said receiving unit; and (b) means to accept the message data on said network bus when the address data on the said bus matches the address of said receiving unit.

9. The system of claim 8 wherein each of said digital units contend for network bus access, and each digital unit includes:
   (a) means to generate a lock signal to gain access to said network bus and to cut-out access by other digital units while said digital unit is operating as a transmitting unit;
   (b) sensing means to sense if a lock signal on said network bus is active to indicate the unavailability of said network bus for a transmitting unit at that time.

10. The system of claim 9 wherein each digital unit includes:
   (a) means to operate in a Wait-For-Address condition as a possible receiving unit when said lock signal is active;
   (b) means to generate a formatted message onto said network bus when said lock signal is inactive and said transmitting unit acquires network bus control and activates said lock signal, said formatted message operating to address a receiving unit for transfer of data to said receiving unit.

11. The system of claim 9 wherein said transmitting unit includes:
   (a) means to provide a delay period on said network bus after placing said destination address data on said bus in order to permit said receiving unit to compare the destination address with said receiving unit address.

12. The system of claim 6 wherein each digital unit, when acting as a transmitting unit, includes:
   (a) delay means, after generating said lock signal to said network bus, for checking to see that data lines in said network bus contain the proper source address of said transmitting unit after said transmitting unit has simultaneously generated said lock signal and its source address onto said network bus means;
   (b) delay means, after generating said destination address, for permitting an address comparison by said receiving means;
   (c) delay means, after generating said longitudinal parity data, for permitting comparison of the longitudinal parity data generated with that received.

* * * * *